United States Patent [19]

Kanamaru

[11] 4,198,657
[45] Apr. 15, 1980

[54] OPTICAL DISK READER WITH MEANS FOR CORRECTING ERRORS DUE TO ECCENTRICITY AND TIME AXIS VARIATIONS

[75] Inventor: Hitoshi Kanamaru, Tokorozawa, Japan

[73] Assignee: Pioneer Electronic Corporation, Tokyo, Japan

[21] Appl. No.: 703,021

[22] Filed: Jul. 6, 1976

[30] Foreign Application Priority Data

Jul. 7, 1975 [JP] Japan .................................. 50-83320
Jul. 7, 1975 [JP] Japan .................................. 50-83321

[51] Int. Cl.$^2$ .......................... H04N 5/76; G11B 7/00; G11B 17/00
[52] U.S. Cl. .......................... 358/128.5; 179/100.3 V; 250/202; 350/6.9
[58] Field of Search ................ 358/128; 179/100.3 V, 179/100.3 G; 250/201, 202; 350/6, 54, 6.5, 6.6, 6.9, 6.91

[56] References Cited

U.S. PATENT DOCUMENTS

| | | | |
|---|---|---|---|
| 3,771,850 | 11/1973 | Casler | 350/6 |
| 3,882,317 | 5/1975 | Camerik | 179/100.3 V |
| 3,952,148 | 4/1976 | Laub | 179/100.3 V |
| 4,005,260 | 1/1977 | Janssen | 179/100.3 V |
| 4,044,378 | 8/1977 | Laub | 358/128 |

*Primary Examiner*—Raymond F. Cardillo, Jr.
*Attorney, Agent, or Firm*—Sughrue, Rothwell, Mion, Zinn and Macpeak

[57] ABSTRACT

An optical reader for reading information recorded on a disk. The reader includes a mirror and a focussing lens. The mirror surface is alterable by feedback means to shift the point of incidence of a light beam passing through the lens onto the disk. The position of the surface is always selected to allow the light beam to pass through the image side focal point of the lens.

3 Claims, 14 Drawing Figures

OPTICAL DISK READER WITH MEANS FOR CORRECTING ERRORS DUE TO ECCENTRICITY AND TIME AXIS VARIATIONS

BACKGROUND OF THE INVENTION

This invention relates to a pick up means or reader for optically reading information recorded on the track of a rotary disk.

It is known to store information, such as video information, on a rotary disk by means of concentrically or spirally arranging minute reflecting dots which are varied in shape and interval in correspondence to a signal such as a television video signal. To read the information thus stored, the video disk is rotated at a constant speed, a light beam is directed onto the track of the video disk, and the reflections, which are modulated with the variation of the dots, are detected and translated into an electrical signal.

A conventional apparatus as shown in FIG. 1 comprises a disk 7, motor 8 and pick-up arm 10. A light beam emitted from a light source 1 (for instance, a helium neon laser) in the pick-up arm is enlarged to have a suitable diameter by a collimator 2 and is focussed on the reflecting surface of rotary disk 7 by means of a beam splitter 3, a quarter wavelength plate 4 for changing the polarization direction, a movable mirror 5, and a focussing lens 6. The quarter wavelength plate 4 is employed for improving the separation of the incident light beam from the reflected light beam, but its presence is not essential. The reflecting surface of the rotary disk 7 is positioned very close to the focal point on the object side of focussing lens 6. Therefore the light beam, as it strikes the disk, is focussed into a minute spot having a diameter of the order of 1 $\mu$m. Since information dots on the reflecting surface of the rotary disk 7 are formed at a pitch of the order of 2 $\mu$m and have a diameter on the order of 1 $\mu$m, the light spot is small enough to discriminate the recorded information.

The reflected, modulated light beam is picked up by the focussing lens 6, and delivered via movable mirror 5 and quarter wavelength plate 4 to the beam splitter 3, where it is reflected toward a light detector 9. The light detector 9 operates to convert the reflected light beam into an electrical signal corresponding to the recorded information. The rotary disk 7 is rotated, for instance, at a speed of 1800 rpm by the electric motor 8, while in order to continuously read the signal arranged spirally or concentrically the pick-up arm 10 is radially shifted as the rotary disk 7 is rotated.

In general, an incident light beam or a reflected light beam is a pencil of light rays whose intensity distribution is such that the intensity decreases with distance from the optical axis as shown in FIG. 2. Therefore the propagation path of a light beam can be represented by the center line maximal in intensity.

In the reader described above, if there is no eccentricity in the rotary disk 7 or the information tracks thereon due to imperfect connection to the shaft of the motor 8 or the like, as the rotary disk 7 rotates, the focussed light spot would follow perfectly the spiral track, and the reflected light beam would accurately reach the light detector 9. However, such ideal conditions are not common and therefore a feedback means which rocks the movable mirror 5 to laterally shift the focussed spot, is employed. This is shown in FIG. 3 where the focussed spot hits the disc 7 to the left of the originally focussed spot (designated x) due to the slight clockwise rotation of mirror 5 by feedback means known in the art. However, there is still the disadvantage that, in order to allow the focussed light spot to follow the spiral track, the reflected light beam is not accurately led to the light detector 9.

If the rotary disk 7 is eccentrically connected to the shaft of the electric motor 8, the spiral track on the disk will be moved right and left, relative to point x, for every rotation of the disk. Since the rotary disk 7 is rotated at a high speed of 1800 rpm, it is impossible to move the whole pick-up arm 10 right and left at such a high speed so as to enable it to follow the track. Accordingly, there appears no alternative to rocking the movable mirror 5, which is small and light, in response to feedback controls to let the light spot follow the track. The arrows in FIG. 3 indicate the incident light beam and the reflected light beam in the case when the mirror 5 is turned with respect to the deflection of the track. As is apparent from ths figure, the incident light beam enters the focussing lens 6 at an angle with the optical axis of the focussing lens 6. Therefore it is focussed accurately onto the track, at a position shifted radially from that in FIG. 1. However, the unfortunate side effect is that the incident light beam is not perpendicular to the reflecting surface of the rotary disk 7, and consequently the reflected light beam therefore advances along an optical path different from that of the incident light beam. As a result the prior art system above has the following disadvantages.

(1) The amplitude of an electrical signal read in synchronization with the eccentricity of the rotary disk is greatly varied, as a result of which the S/N ratio becomes low, and the read signal fluctuates.

(2) The feedback means requires a light detector having a large area light receiving surface, and therefore the S/N ratio and the frequency characteristic becomes low.

(3) The amount of eccentricity allowable for the connection of the rotary disk is considerably small, and accordingly the rotary disk itself and the rotating bearing mechanism must be high is accuracy.

(4) It is known that time axis variations or errors of the read signal due to irregular rotation of an electric motor can be corrected by moving the incident light beam spot forward or backward on the circular or spiral track with respect to the rotating direction of the rotary disk. However, in such correction of the time axis variation, the position of the reflected light beam to the light detector is varied by the turning of the movable mirror, that is, it is impossible to correct the time axis variation with the apparatus of FIG. 3.

SUMMARY OF THE INVENTION

It is therefore an object of the present invention to provide an optical reader for reading the information stored in tracks on a disk without the disadvantages mentioned above.

It is a further object to provide an optical reader with a mirror means that can be altered to cause an incident beam to accurately follow an information track on a record disk without varying the angle of incidence of the incident beam on the disk. The mirror is arrange relative to the rest of the reader optics and the disk such that the incident beam center line always passes through the image side focal point of the focussing lens. As a consequence all beams become parallel to the lens optical axis on the object side thereof and strike the disk perpindicularly thereto.

The object is carried out by a first embodiment wherein the reflecting surface and the turning axis of the movable mirror are positioned at the focal point on the image side of the focussing lens (or objective lens) so that the substantial center of the incident light beam passes through the focal point on the image side.

According to a second embodiment of the invention, although the mirror is not positioned at the focal point on the image side of the lens, the beam is none the less caused to pass through the image side focal point. This is accomplished by changing the mirror position, as well as, or more accurately, in coordination with, the changing angle of the mirror surface.

DETAILED DESCRIPTION OF PREFERRED EMBODIMENTS

Figure 1:
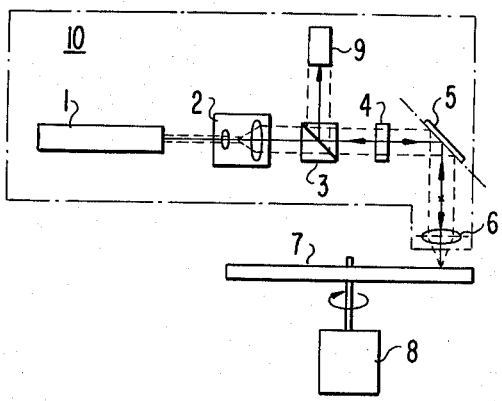
FIG. 1 is an explanatory diagram illustrating the arrangement of a conventional reader.
Figure 2:
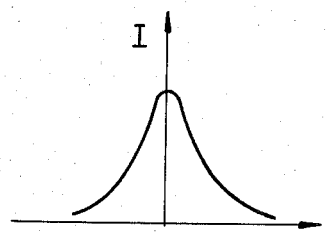
FIG. 2 is a graphical representation indicating intensity distribution of the pencil beam of light.
Figure 3:
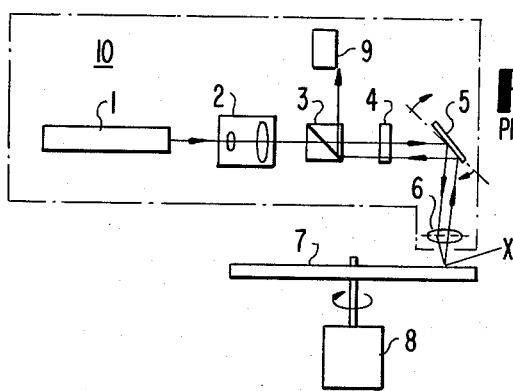
FIG. 3 is an explanatory diagram showing the conventional reader illustrated in FIG. 1 with its movable mirror turned.
Figure 4:
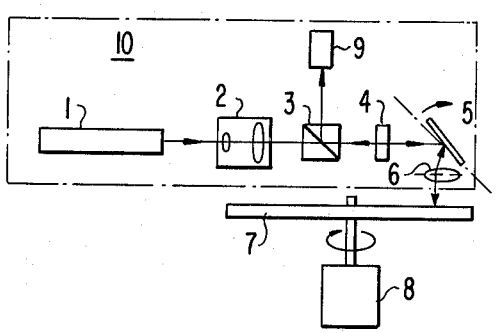
FIG. 4 is also an explanatory diagram illustrating the arrangement of one preferred example of a reader according to this invention.

The embodiment shown in FIG. 4 differs from the prior art FIG. 1 in that the position of the movable mirror is brought to the focal point on the image side of the focussing lens 6. This positional relationship will be described in more detail with reference to FIG. 5.

Figure 5:
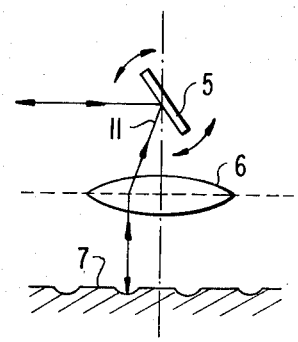
FIG. 5 is a diagram for describing the operation of the first embodiment.

As is shown in FIG. 5, the movable mirror 5 is arranged so that its turning axis is positioned at the focal point 11 on the image side (i.e. image side focal point), the turning axes being on the reflecting surface of the movable mirror 5.

Accordingly, the light beam pencil reflected by the movable mirror enters the focussing lens 6 in such a manner that the center of the light beam pencil always passes through the image side focal point 11 at all times regardless of the angle of the movable mirror 5. Thus the light beam introduced into the focussing lens 6 via the focal point 11 will be refracted thereby to advance parallel with the optical axis of the focussing lens 6. In addition, the surface of the rotary disk 7 is arranged perpendicular to the optical axis of the focussing lens 6.

The distance between the light spot incident on the disk and the optical axis of lens 6 is proportional to the turning, or swinging, angle of the movable mirror 5, and the center line of the light beam pencil is perpendicular to the surface of the rotary disk 7 at all times. The light beam reflected by the surface of the rotary disk 7 is returned through the focussing lens 6 and the movable mirror 5 to the light detector, passing through the completely same path as that of the incident light beam. In other words, even if the movable mirror 5 is swung or turned so that the incident light beam follows the track on the rotary disk 7 at all times, the reflected light beam which has been modulated by the information of the rotary disk 7 will reach the center of the light detector 9.

Figure 6:
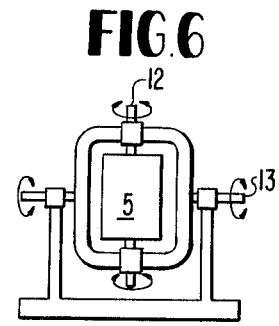
FIG. 6 illustrates an arrangement for simultaneously rotating a mirror about two coordinate axes.

If the movable mirror 5 is supported by a gimbal mechanism which, as shown in FIG. 6, can turn around either a turning axis 12 or a turning axis 13 perpendicular to the turning axis 12, the position of the focussed light point on the rotary disk 7 can be moved, as desired, in a radial direction or in a circumferential direction independently. In this case also, the reflected light beam will reach the light detector 9 exactly, and both the eccentricity of the record track and the time axis variation can be corrected.

As is apparent from the latter description of the first embodiment, since the reflecting surface and the turning axis of the movable mirror is positioned at the image side focal point of the focussing lens, the incident light beam and the reflected light beam advance along the same light path regardless of the turning angle of the movable mirror, and therefore a range allowable for the deformation or eccentricity of the rotary disk can be increased. Furthermore, the light receiving surface of the light detector can be small in area, and the detection characteristic of the same can be improved. In addition, both the eccentricity and the time axis variation can be corrected by only one movable mirror.

While the above reader is suitable in certain circumstances, it has some drawback which limit its effectiveness to those cases where the eccentricity is small. First of all, the focussing lens employed must have a performance substantially equal to that of a microscope objective lens having a magnification of the order of 40X. Therefore, the distance between the surface of the lens and the image side focal point is less than several millimeters. Accordingly, (1) an ordinary focussing lens available at a low price cannot be used, (2) a movable mirror large enought to utilize the effective opening of a focussing lens cannot be used, (3) a specially designed focussing lens is required, and (4) the distance between the focussing lens and the movable mirror cannot be changed as required.

Figure 7:
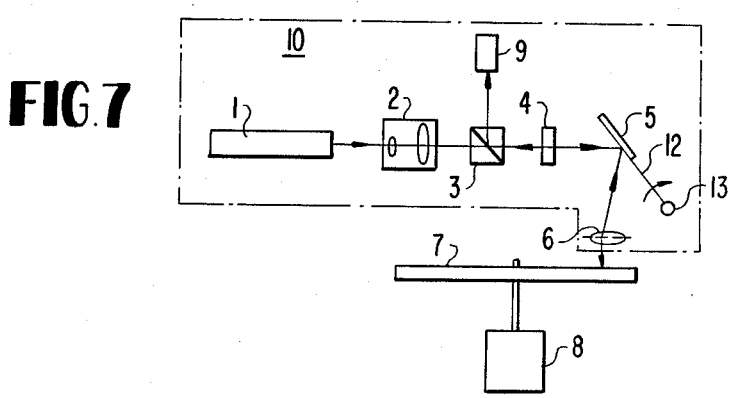
FIG. 7 is an explanatory diagram showing a second example of a reader according to this invention.

According to a second embodiment, illustrated in FIG. 7 the movable mirror 5 is fixed on a supporting arm 12 which can rotate around an arm pivot point 13. Also the mirror surface makes an angle α with the pivot arm 12 (the angular relation is not shown in FIG. 7) The pivot point or axis of the mirror surface relative the pivot arm is referred to herein as the mirror surface pivot point and exists at the axis of contact of mirror 5 and pivot arm 12. By swinging the supporting arm 12 about arm pivot point 13 the reflecting angle θ and the position of the movable mirror 5 are simultaneously changed. Therefore, if the position of the arm pivot point 13 is suitably selected, the substantial center of the incident light beam can be caused to pass through the image side focal point 11 of the focussing lens, without the need for positioning the reflecting surface of the movable mirror 5 at the image side focal point as in the earlier described embodiment.

Figure 8A:
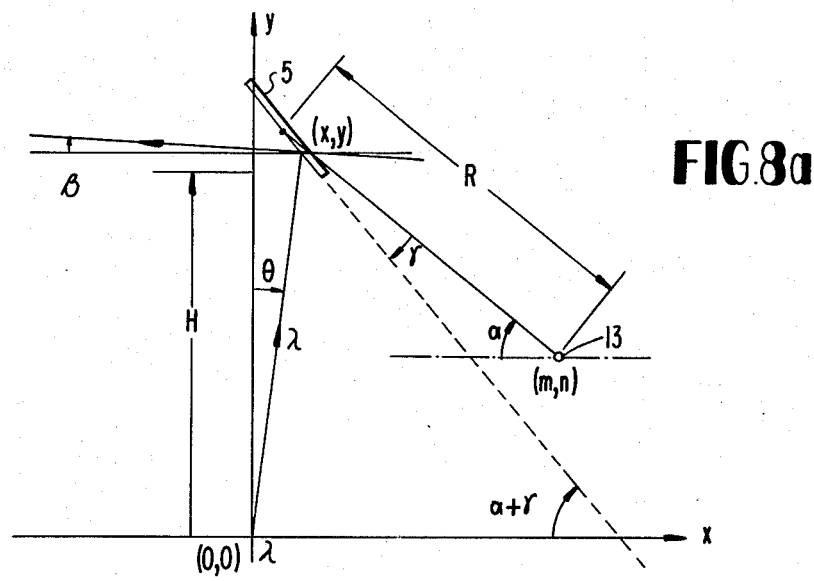
FIGS. 8a, 8b and 9 are diagrams helpful in explaining the principle of operation of the second example.
Figure 8B:
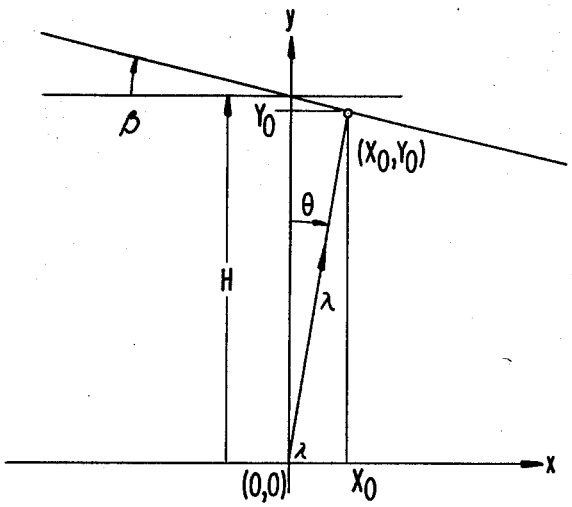

It can be shown by reference to FIGS. 8a and 8b and to the following, that a position m, n can be selected for the arm pivot point 13 whereby rotation of the arm 12 will change the angle $\theta$ at which the incident beam approaches the lens 6, but at the same time will direct the beam through the image side focal point of lens 6.

The generalized case will be described with reference to FIG. 8a and a coordinate x-y axis having a point (o,o) corresponding to the image side focal point of lens 6. The following definitions are applicable;

(X, Y): the point of incidence of the substantial center of the incident light beam on mirror surface 5;

m: the distance in the plane of the lens (i.e. horizontal) between the lens optical axis and arm pivot point 13;

n: the distance, parallel to the optical axis, between the image side focal point and the arm pivot point 13;

(m, n): the x, y coordinate position of arm pivot point 13;

R: the length or radius of arm 12 from point 13 to the mirror surface turning axis point;

H: the distance along the y axis between the image side focal point to the mirror point of incidence (i.e. X, Y) when $\theta=0$;

$\theta$: the angle between the incident beam after mirror reflection and the optical axis of lens 6;

$\beta$: assumed angle of incidence of incident beam, before mirror reflection, with respect to the horizontal; note for a given case $\beta$ remains constant and can be equal to 0;

$\alpha$: angle of arm 12 and the horizontal;

$\gamma$: angle between arm 12 and mirror surface 5;

From FIG. 8a we can write the following equations;

$$\beta = 2(\alpha+\gamma) - \theta - \pi/2$$

$$y = x \cot \theta$$

$$y = -(x-m)\tan\alpha + n$$

$$y = -x - (m - R\cos\alpha)\tan(\alpha+\gamma) + (n+R\sin\alpha)$$

Solving the above equations for $x=X$ and $y=Y$, we obtain the following equation for the reflection point of mirror 5:

$$Y = \frac{(m - R\cos\alpha)\tan(\alpha + \gamma) + (n + R\sin\alpha)}{1 + \tan\theta \cdot \tan(\alpha + \gamma)} \quad (1)$$

$$X = \frac{(m - R\cos\alpha)\tan(\alpha + \gamma) + (n + R\sin\alpha)\tan\theta}{1 + \tan\theta \cdot \tan(\alpha + \gamma)}$$

Also, if $\alpha_o$ is defined as $\alpha$ when $\theta=0$, we can write the following:

$$\alpha_o = \tan^{-1}\left(\frac{H-n}{m}\right)$$

$$\alpha = (\theta/2) + \alpha_o$$

$$R = \sqrt{m^2 + (H-n)^2}$$

$$\gamma = \pi/4 + \beta/2 - \alpha_o$$

Thus it can be seen from the latter equations that the angle $\gamma$ depends on the angle $\beta$ and the positions H, n and m, and since $\beta$ does not change during operation, the angle can remain fixed based on selection of H, n and m. Also, changes in $\alpha$ will only affect $\theta$, which is a desirable achievement since changes in $\theta$ shift the position where the spot irradiates the disk but do not change the fact that the beam passes through the image focal point (0.0).

From FIG. 8b position of $(X_o, Y_o)$ may be given in a form of the following equations in order that the reflecting light may pass through the point (H, O), having no relation to $\theta$.

$$Y_o = \frac{H}{1 + \tan\theta\tan} \quad (2)$$

$$X_o = \frac{H\tan\theta}{1 + \tan\theta\tan}$$

From the equation (1) and (2), the position (m, n) to minimize $\Delta Y$ and $\Delta X$ is approximated by solving the following equation.

$$\frac{H}{1 + \tan\theta \cdot \tan\beta} = \frac{(m - R\cos\alpha)\tan(\alpha + \gamma) + (n + R\sin\alpha)}{1 + \tan\theta \cdot \tan(\alpha + \gamma)}$$

$$n = m - H\tan\left(\frac{\pi}{4} - \frac{\beta}{2}\right) \cdot \tan\left(\frac{\pi}{4} - \frac{\beta}{2}\right)$$

When $\theta$ is very small and negligible, the solution of the above equation can be given.

When $n=H$, $m=(2/\cos\beta) \cdot H$

The position (m, n) to minimize the length of the lever is as follows:

$$n = 0$$

$$m = H \cdot \tan\left(\frac{\pi}{4} - \frac{\beta}{2}\right)$$

Figure 9:
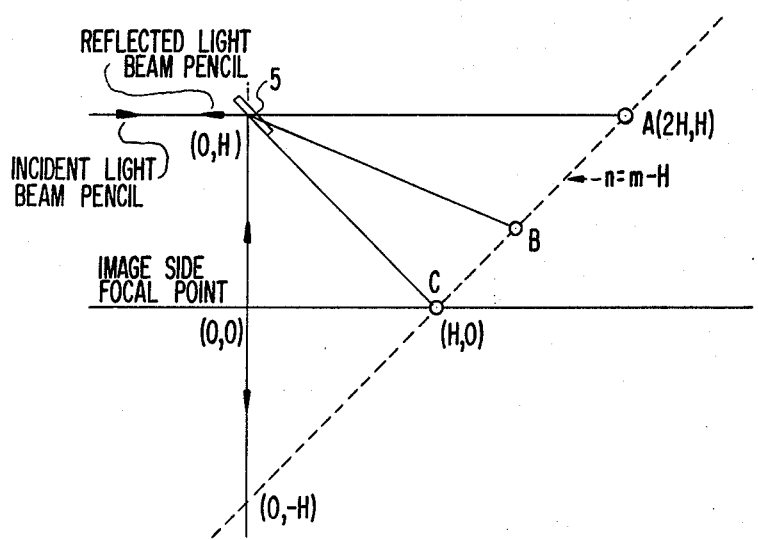

A concrete example satisfying the above-described equation will be described. When $\beta=0$, $n=m-H$, and the position of the shaft 13 is at an optional point on the broken line shown in FIG. 9. As is apparent from FIG. 7, if H is increased, the point 13 and the movable mirror 5 can be positioned sufficiently apart from the focussing lens 6.

Figure 10:
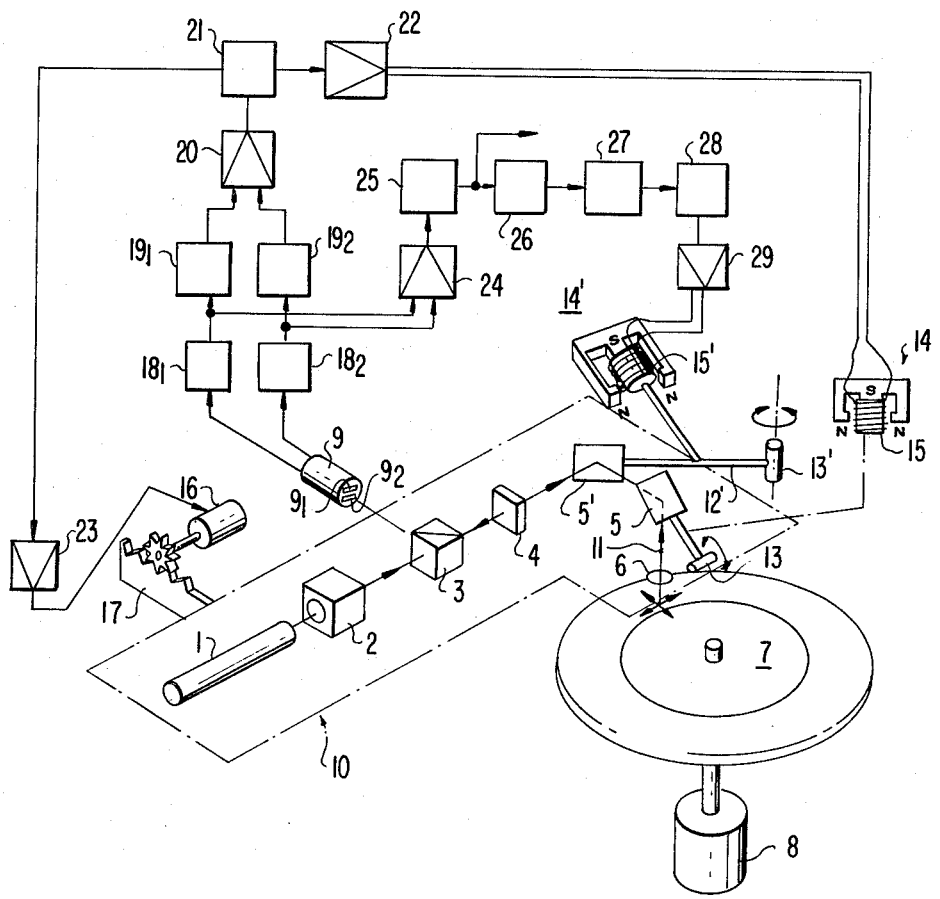
FIG. 10 is a diagram showing the type arrangement of a concrete example of the reader according to this invention.

A concrete example of the reader according to this invention is illustrated in FIG. 10, in which both the eccentricity of the record track and the time axis variation are corrected.

In this example, a movable mirror 5 for correcting the eccentricity and a movable mirror 5' for correcting the time axis variation are provided. These movable mirrors 5 and 5' are supported by supporting arms 12 and 12' and shafts 13 and 13'. The positional relationships between the shafts 13 and 13' and the movable mirrors 5 and 5' are set according to the method described with reference to FIGS. 8a and 8b. The movable mirrors 5 and 5' are turned upon energization of voice coils 15 and 15' of mirror drivers 14 and 14' connected to the supporting arms 12 and 12', respectively. The pick-up arm 10 is so designed as to move radially with respect to the rotary disk 7 by means of a feed motor 16 and a gear mechanism 17. The light detector 9 is constituted by a pair of light detecting elements $9_1$ and $9_2$. Preamplifiers $18_1$ and $18_2$ operate to amplify two signals from the light detector 9. Detectors $19_1$ and $19_2$ operate to detect outputs of the preamplifiers 18₁ and 18₂, respectively. A differential amplifier 20 obtains a difference signal between two signals of the detectors 19₁ and 19₂. A compensation circuit 21 serves to separate a predetermined signal component out of the output of the differential amplifier 20 and to subject the signal component thus separated to predetermined waveform processing. A power amplifier 22 operates to amplify one of the outputs of the compensation circuit 21 thereby to feed current to the voice coil of the mirror driver 14, while a power amplifier 23 operates to amplify the other output of the compensation circuit 21 thereby to feed current to the feed motor 16.

The example shown in FIG. 10, further comprises: an addition circuit 24, or adder, for summing both outputs of the preamplifiers 18₁ and 18₂; a demodulator 25 for demodulating the output of the adder 24; a synchronizing signal separating circuit 26 for detecting only a video synchronizing signal from a video output of the demodulator 25; a time interval detecting circuit 27 for detecting the error in time interval of the synchronizing signal of the synchronizing signal separating circuit 26; a compensation circuit 28 for subjecting the output of the time interval detecting circuit 27 to waveform processing; and a power amplifier 29 for amplifying the output of the compensation circuit 28 to supply current to the voice coil 15′ of the mirror driver 14′.

Figure 11:
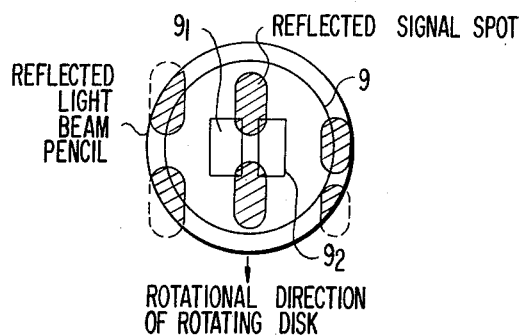
FIG. 11 is a plan view illustrating the positional relationships between a reflected light beam and a light detector.
Figure 12:
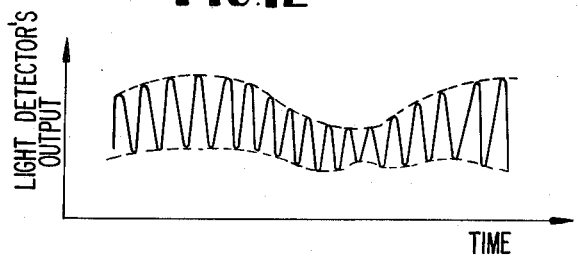
FIG. 12 is a graphical representation indicating an output waveform of the light detector.

In the reader thus organized, the light beam reflected by the rotary disk 7 is led to the light detector 9, and has a positional relationship as shown in FIG. 11 relative light sensing surfaces 9₁ and 9₂. If the incident light beam focussed by the focussing lens 6 is accurately positioned on the record track, half of the reflected signal spot is applied to each of the light detecting element 9₁ and 9₂, and therefore equal electrical signals are obtained respectively at the outputs of the preamplifiers 18₁ and 18₂. The difference is zero and no adjustment of mirror 5 occurs. On the contrary, if the track is staggered due to the eccentricity, the reflected light beam spot is shifted rightward or leftward, that is, the reflected light beam spot irradiates the light detecting elements 9₁ and 9₂ with different intensity, respectively. As a result there is a difference between the outputs of the preamplifiers 18₁ and 18₂. The output waveform of the light detector 9 is as shown in FIG. 12, and consists of a high frequency component corresponding to the recorded signal and a low frequency component caused by contamination or the like of the surface of the rotary disk 7. All that is necessary for the reader is that only the high frequency component be provided at the outputs of the preamplifiers 18₁ and 18₂. The difference in amplitude between the outputs of the preamplifiers 18₁ and 18₂ becomes an electrical signal in the form of an envelope in the detectors 19₁ and 19₂. The output of the differential amplifier 20 becomes an error signal representing the tracking conditions of the incident light beam. Relatively high frequency components (essentially 30 Hz corresponding to the speed of the rotary disk) of this error signal are applied to the voice coil 15 of the mirror driver 14 through the power amplifier 22 whereby in the case of abrupt variation due to the eccentricity, the movable mirror 5 is caused to follow the abrupt variation thereby to enable the incident light beam to accurately aim at the track. On the other hand, relatively low frequency components of the error signal are applied through the power amplifier 23 to the feed motor 16 to move the pick-up 10 in a radial direction of the rotary disk 7 in such a manner that the incident light beam is evenly applied to the track.

Figure 13:
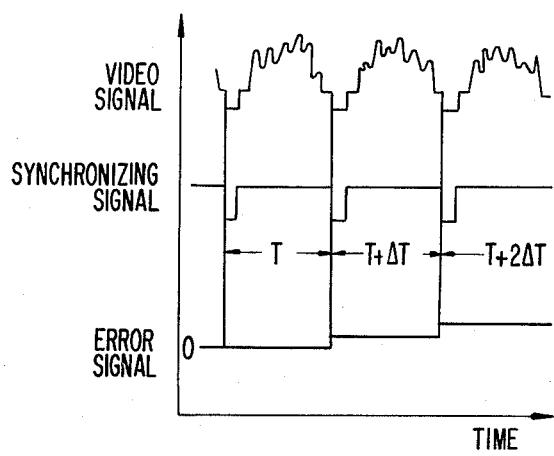
FIG. 13 is also a graphical representation indicating a video signal, a synchronizing signal, and a time interval error signal.

The video signal from the demodulator 25 is introduced into a video signal receiver, where it is reproduced; however, error appears in the time interval of a synchronizing signal of the video signal because the signal read out by the light detector 9 involves the time axis variation whose period corresponds to one revoluton of the rotary disk 7, due to the eccentricity of the rotary disk 7. Therefore, as is shown in FIG. 13, only the synchronizing signal is detected by the synchronizing signal separating circuit 26; the error in time interval of the synchronizing signal output from the synchronizing signal separating circuit 26 is detected by the time interval detecting circuit 27; the output of the time interval detecting circuit 27 is applied to the voice coil 15′ of the mirror driver 14′ through the compensation circuit 28 and the power amplifier 29. As a result, the movable mirror 5′ is moved, and the reflected light beam spot is moved upward or downward, that is, the time axis correction can be achieved in which the time instant the reflected light beam spot irradiates the light detecting elements 9₁ and 9₂ is advanced or delayed.

What is claimed is:

1. In an optical reader of the type having a light beam source, a reflecting mirror, a lens for focussing said light beam after reflection from said reflecting mirror onto a track of a rotating disk, an electrooptical detecting means for detecting said light beam after reflection from said track and passing back through said lens and being re-reflected by said mirror, and feedback means responsive to the output of said electrooptical detecting means for altering the position of the reflecting surface of said mirror to shift the point of incidence of said beam on said disk to cause said beam to follow an information track on said disk, the improvement characterized by:

said mirror being connected to a pivot arm having a pivot point (n, m), other than the focal point of said lens, about which said arm is rotatable, said feedback means controlling the rotation of said pivot arm about said pivot point such that the substantial center of said beam of light always passes through the focal point on the image side of said lens.

2. An optical reader as claimed in claim 1 wherein said pivot point is located at a distance n from the optical axis of said lens, said distance n being measured in a plane perpendicular to said optical axis, and at a distance m from the focal point, said distance m being measured along said optical axis, and wherein the connection point of said mirror and said arm intersecting said optical axis at a distance H from the focal point measured along the optical axis, the distance H, m and n bearing the following relationship:

$$n = \left\{ m - H \tan(\tfrac{\pi}{4} - \tfrac{\beta}{2}) \right\} \cdot \tan(\tfrac{\pi}{4} - \tfrac{\beta}{2});$$

where $\beta$ is the angle of the light beam with respect to a plane perpendicular to the lens axis just prior to incidence upon said mirror.

3. An optical reader as claimed in claim 2 wherein said feedback means comprises means responsive to said reflected beam of light for developing an electrical signal having a magnitude dependent upon the accurracy of incidence of said beam on said information track, and electromagnetic means responsive to said electrical signal for rotating the said arm to maximize the accuracy of impingement of said beam on said information track.

* * * * *